(12) United States Patent
Jin

(10) Patent No.: US 9,320,003 B2
(45) Date of Patent: Apr. 19, 2016

(54) DETECTING A NARROW BAND RANGING SIGNAL IN AN OFDM FRAME

(71) Applicant: Cisco Technology, Inc., San Jose, CA (US)

(72) Inventor: Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 14/091,719

(22) Filed: Nov. 27, 2013

(65) Prior Publication Data

US 2015/0146712 A1 May 28, 2015

(51) Int. Cl.
*H04J 3/06* (2006.01)
*H04W 56/00* (2009.01)
*H04L 27/26* (2006.01)

(52) U.S. Cl.
CPC ......... *H04W 56/006* (2013.01); *H04L 27/2663* (2013.01); *H04L 27/2672* (2013.01); *H04L 27/2675* (2013.01); *H04L 27/2688* (2013.01); *H04L 27/2692* (2013.01); *H04W 56/0065* (2013.01)

(58) Field of Classification Search
CPC .......................... H04W 56/006; H04L 27/0014
See application file for complete search history.

(56) References Cited

U.S. PATENT DOCUMENTS

| | | | |
|---|---|---|---|
| 6,459,703 B1 | 10/2002 | Grimwood et al. | |
| 6,570,913 B1 | 5/2003 | Chen | |
| 7,587,001 B2 | 9/2009 | Hazani et al. | |
| 2006/0083160 A1* | 4/2006 | Koo et al. | 370/208 |
| 2007/0058524 A1 | 3/2007 | Modlin et al. | |
| 2010/0208675 A1* | 8/2010 | Song et al. | 370/329 |
| 2010/0260294 A1 | 10/2010 | Zhengang et al. | |
| 2011/0013713 A1* | 1/2011 | Li et al. | 375/267 |
| 2011/0026633 A1* | 2/2011 | Sahara | 375/267 |
| 2011/0129023 A1 | 6/2011 | Hoffmann et al. | |
| 2012/0032855 A1* | 2/2012 | Reede et al. | 342/458 |
| 2013/0205329 A1 | 8/2013 | Markley et al. | |
| 2014/0169502 A1* | 6/2014 | Lovell | 375/324 |

OTHER PUBLICATIONS

Gummalla, Ajay, "DOCSIS Overview," IEEE 802.3 Ethernet in the First Mile Study Group Jul. 2001, retrieved from http://www.ieee802.org/3/efm/public/jul01/presentations/gummalla_1_0701.pdf, pp. 1-19.

CableLabs, "MAC and Upper Layer Protocols Interface Specification—Section 7.1—Timing and Synchronization," Data-Over-Cable Service Interface Specifications DOCSIS 3.0, revised Feb. 10, 2011, pp. 159-162.

Mahmoud et al., "An Efficient Initial Ranging Algorithm for WiMAX (802.16e) OFDMA", Computer Communications, Elsevier Science Publishers, vol. 32, No. 1, Jan. 23, 2009, pp. 159-168.

(Continued)

*Primary Examiner* — Andrew Chriss
*Assistant Examiner* — Romani Ohri
(74) *Attorney, Agent, or Firm* — Edell, Shapiro & Finnan, LLC

(57) ABSTRACT

Techniques are presented for a first device configured to be in communication with a second device in a digital communication system to receive an orthogonal frequency division multiplexed (OFDM) ranging signal from the second device. The OFDM ranging signal comprises a plurality OFDM symbols that encode a known bit sequence within a subset of available OFDM communication subcarriers and a subset of available time slots. The OFDM ranging signal is analyzed to determine a timing offset for the second device due to a time for signals to travel between the first device and second device over a communication channel. A message is transmitted from the first device to the second device, the message including information configured to indicate the timing offset.

20 Claims, 10 Drawing Sheets

(56) References Cited

OTHER PUBLICATIONS

Thiagarajan et al., "Initial Ranging Code Detector for IEEE 802.16—Compliant TDD OFDMA Systems", 2011 IEEE Wireless Communications and Networking Conference, Mar. 28, 2011, pp. 1652-1657.

"Cable Fourth Generation Transmission Systems for Interactive Cable Television Services—IP Cable Modems Part 2: Physical Layer, DOCSIS 3.1: Cable-00017-2v001", ETSI Draft, European Telecommunications Standards Institute, vol. Cable, Mar. 28, 2014, pp. 1-237.

International Search Report and Written Opinion in counterpart International Application No. PCT/US2014/066744, mailed Feb. 26, 2015, 14 pages.

Al-Banna, et al., "DOCSIS® 3.0 Upstream Channel Bonding: Performance Analysis in the Presence of HFC Noise," SCTE Conference on Emerging Technologies® 2009, Feb. 2009, pp. 1-38.

\* cited by examiner

US 9,320,003 B2

DETECTING A NARROW BAND RANGING SIGNAL IN AN OFDM FRAME

TECHNICAL FIELD

The present disclosure relates generally to detecting a narrow band ranging signal when the ranging signal is transmitted in an orthogonal frequency division multiplexed (OFDM) frame using a relatively small subset of radio frequency subcarriers.

BACKGROUND

Many communication systems, e.g., WiMAX®, Long Term Evolution (LTE), Data-Over-Cable Service Interface Specification (DOCSIS) based systems, etc., employ a central network access point, such as a base station, to service a plurality of subscriber or client devices. These systems may employ ranging signals to determine a distance (or channel response) between the base station and individual client devices. Knowledge of the range or distance between the base station and the client device improves efficiencies in the communication system. For example, knowledge of the distance allows both the base station and the client device to adjust their transmit power to more optimal levels. In another example, it is desirable for client devices to employ transmission timing offsets such that their transmissions arrive at their servicing base station at a scheduled time, or to otherwise synchronize data communications for base station resource efficiency.

DESCRIPTION OF EXAMPLE EMBODIMENTS

Overview

Figure 1:
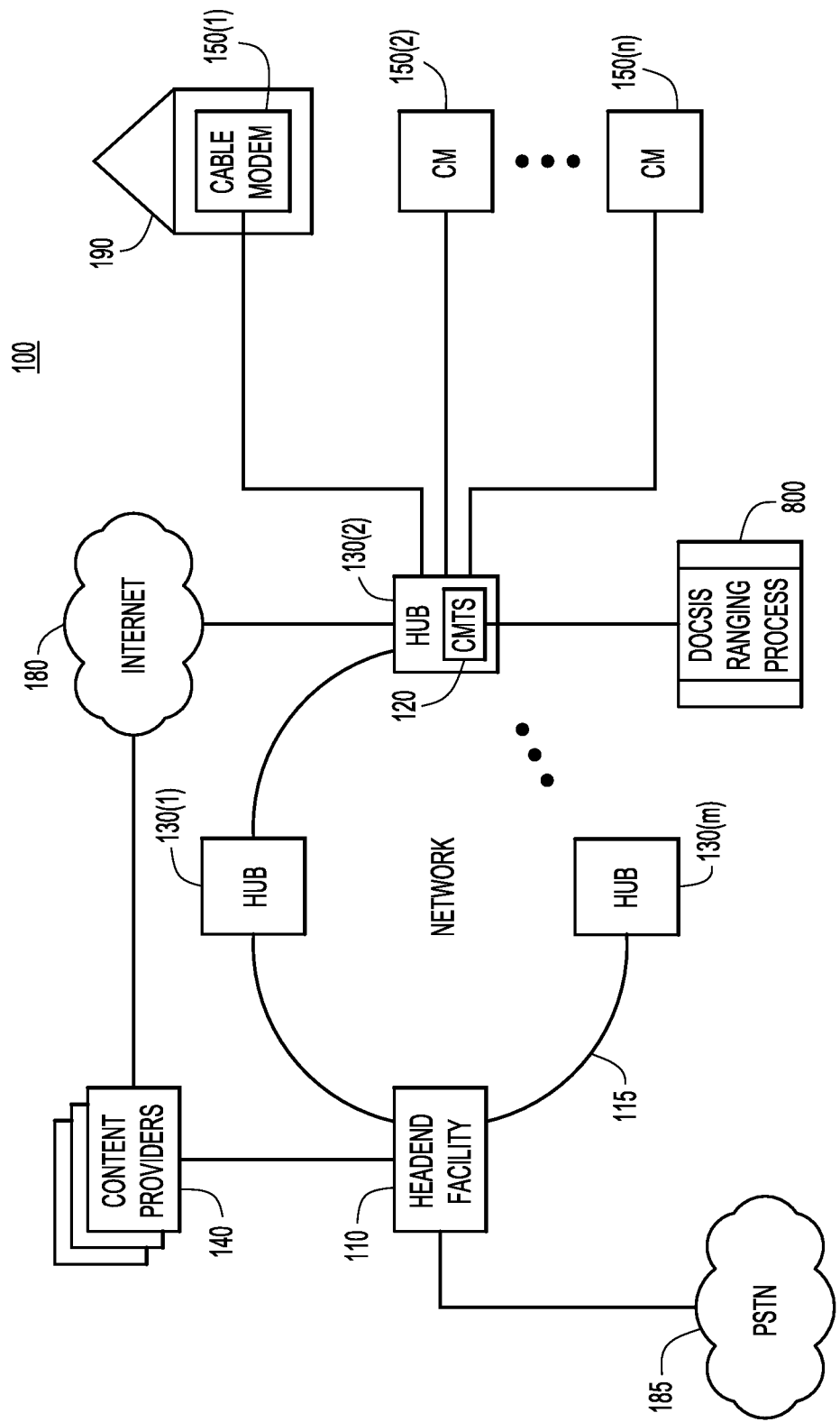
FIG. 1 is a diagram of an example cable distribution system employing narrow band OFDM ranging signal detection according to the techniques presented herein.

Techniques are presented herein for a first device configured to be in communication with a second device in a digital communication system. The first device receives an orthogonal frequency division multiplexed (OFDM) ranging signal from the second device, where the OFDM ranging signal comprises a plurality OFDM symbols that encode a known bit sequence within a subset of available OFDM communication subcarriers and a subset of available time slots. The OFDM ranging signal is analyzed to determine a timing offset for the second device due to a time for signals to travel between the first device and second device over a communication channel. A message is transmitted from the first device to the second device, the message comprising information configured to indicate the timing offset.

Example Embodiments

DOCSIS is a communication protocol that is used to send digital video and data from a hub or headend facility (HEF) to a cable modem (CM) at a customer premise. Digital video is a one-way or downstream application from the hub to the cable modem, e.g., a television program, while data services are two-way (downstream and upstream) applications, e.g., Internet Protocol (IP) web browsing or IP telephony. For downstream transport, both digital video and data may be encapsulated using the DOCSIS and Motion Picture Experts Group (MPEG) protocols prior to transport. For cable modem operations, a CMTS is typically deployed in a HEF or hub that is configured to manage and support programming and Internet services for a plurality of CMs.

DOCSIS version 3.1 expands upon existing DOCSIS protocol standards and deployed systems by way of OFDM technology. OFDM involves dividing a given frequency space into a plurality of orthogonal subcarriers. For example, in a cable system, video and data may be transmitted on a single or multiple (bonded) physical channels, such as 6-8 MHz wide quadrature amplitude modulator (QAM) channels for downstream transmissions. Upstream transmissions may use the same or a different RF transmission scheme. OFDM subdivides that RF space into a plurality of subcarriers that each comprises a small portion of the spectrum. For example, a subcarrier may comprise 25 or 50 kilohertz (kHz) of radio frequency (RF) bandwidth. Each subcarrier is modulated orthogonally with respect to other subcarriers such that tens or hundreds of subcarriers may be used over a 6 MHz RF channel while limiting inter-subcarrier interference. By way of example, a 6 MHz physical channel may be divided into 25 kHz wide subcarriers which yields 240 potential subcarriers (6 MHz/25 kHz=240 available subcarriers).

In some communication systems a central access point, such as a base station or CMTS, serves a plurality satellite or subscriber devices, such as cell phones or cable modems. To improve communication efficiency and reduce interference, it may be beneficial to have subscriber devices adjust their transmission timing so that their transmissions arrive at the central access point at a specified time or time slot, rather than have the central access point adjust timing for hundreds of subscribers' devices. In order to synchronize received transmissions at the central access point, subscribers transmit ranging signals in order to determine a timing advance (TA) or timing offset (TO) for their transmissions. The timing offset compensates for propagation delay relative to the physical transmission distance and other communication channel conditions. The subscriber's distance or range from the central access point is proportional to the time it takes for a transmission from the subscriber device to reach the central access point. In other words, while transmissions travel near or at a fraction of the speed of light, there is a measurable delay from the time a signal is transmitted until the time the transmission is received.

In cable systems, the physical medium, such as hybrid fiber coax (HFC) cable, is shared among upstream and downstream transmissions between a CMTS and serviced CMs. Cable systems typically employ separate upstream and downstream RF spectrum. Transmission delays are proportional to the distance from a CMTS to a CM, and vice versa, as well as any delay induced by the actual frequencies used for transmissions over HFC. Since there is but one CMTS per, e.g., hundreds of CMs, determining a range between a CM and its serving CMTS is beneficial such that upstream and downstream transmission timing is made relatively constant with respect to the CMTS, while transmission timing is adjusted by each communicating CM.

Employing OFDM in a system that limits a ranging signal spectrum to a subset of available OFDM subcarriers and a subset of available time slots, i.e., a narrow band ranging signal, for determining a timing offset for a given device, presents challenges that are not present when the entire OFDM RF bandwidth, e.g., a wideband ranging signal, is available for ranging signals. One such system is a cable television system, and to illustrate narrow band ranging in a cable system, reference in now made FIG. 1. In FIG. 1, an example cable system or network 100 is shown that employs OFDM based narrow band ranging for DOCSIS. Specifically, system 100 includes a headend facility (HEF) 110, a network 115, a plurality of hubs 130(1)-130(m), and a plurality a cable modems (CMs) 150(1)-150(n) with CM 150(1) residing in a customer premise 190. Hub 130(2) houses a CMTS 120 that is configured to implement DOCSIS ranging process 800.

The HEF 110 is connected to various content providers 140 for providing media content (e.g., movies, television channels, etc.). The media content is distributed by HEF 110 to hubs 130 via network 115 (e.g. a synchronous optical network (SONET), synchronous digital hierarchy (SDH) network, or IP network). The content is further distributed by hubs 130 to the plurality of CMs 150(1)-150(n) in the form of conventional digital video or IP television services.

Each of hubs 130(1)-130(m) may also be connected to Internet 180 and public switched telephone network (PSTN) 185 (via HEF 110) for providing Internet and telephony services (e.g., to and from customer premise 190). Media content may also be distributed by content providers 140 via Internet 180. Each of the other hubs 130(1)-130(m) may also have a CMTS that implements the DOCSIS ranging process 800. The DOCSIS ranging process 800 will be described by way of specific examples in connection with FIGS. 2-7 and more generally in connection with FIG. 8. Briefly, the DOCSIS ranging process 800 allows a CMTS to determine a timing offset for a given CM based on the CM's upstream narrow band ranging signal. The timing offset is relayed back to the CM for the CM to adjust transmission timing.

The CMs 150(1)-150(n) act as a bridge between the cable network and the home network (not shown) for providing data services (e.g., Internet, telephony, IP television services, etc.). In the context of this disclosure, CM 150(1) may be DOCSIS/EuroDOCSIS compliant (version 3.1 or greater). DOCSIS 3.1 makes use of OFDM technology to increase service provider flexibility and RF spectral efficiency. It will be appreciated that other CMs throughout system 100 may not be DOCSIS 3.1 compliant.

Figure 2:
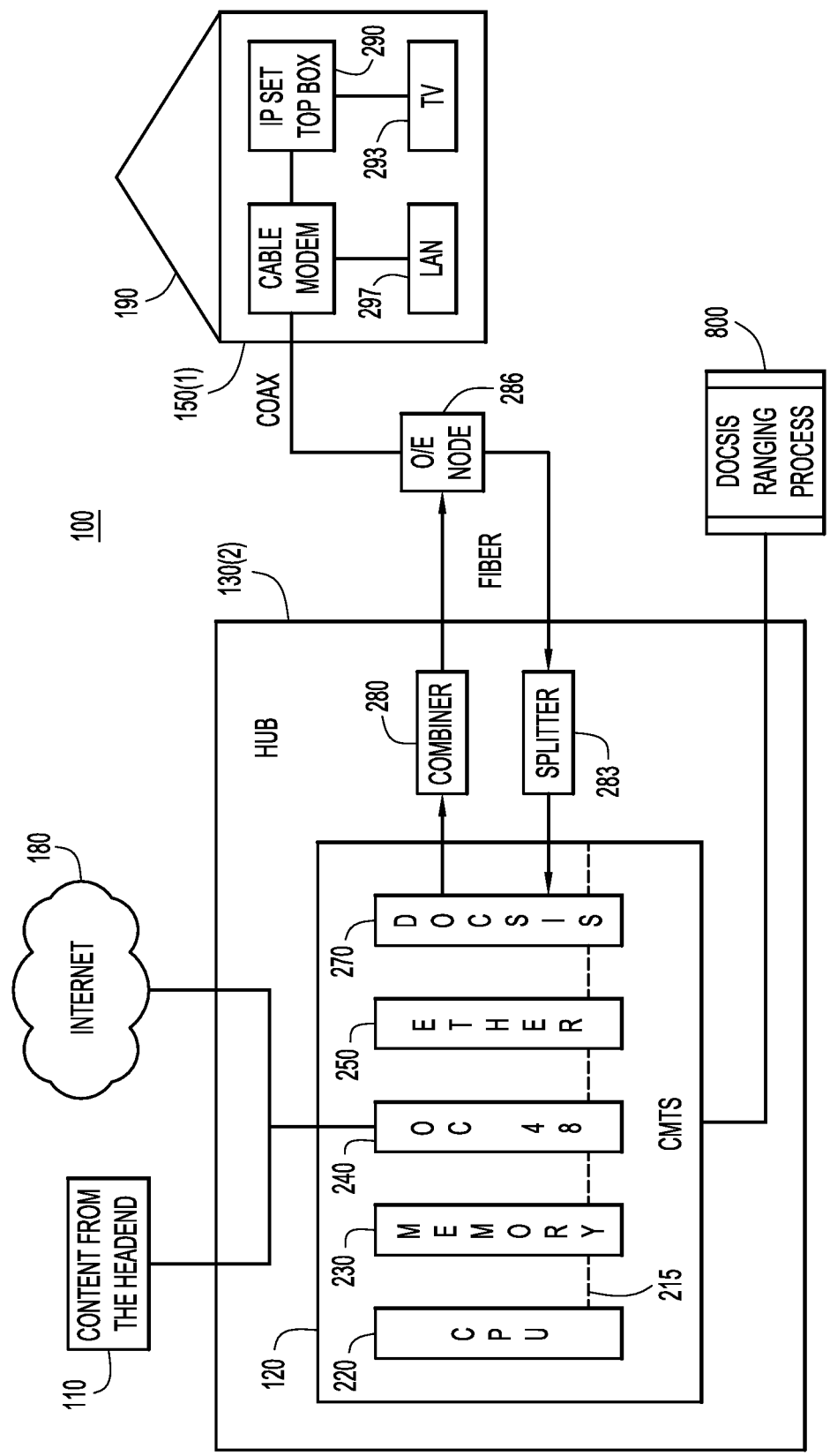
FIG. 2 is a diagram of an example hub within the system of FIG. 1 with a cable modem termination system (CMTS) that is configured to employ narrow band OFDM ranging signal detection.

Referring now to FIG. 2, a portion of system 100 is shown in greater detail. In this example, customer premise 190 further houses an IP set top box 290 coupled to CM 150(1) and a television (TV) 293. CM 150(1) also connects to a local area network (LAN) 297. The LAN 297 may connect to other wired/wireless devices (e.g., personal computers (PCs) or personal data assistants (PDAs), etc.) and may serve as a gateway or access point through which additional PCs or consumer devices have access to data network facilities and Internet Protocol television services. IP set top box 290 receives media content over IP and de-encapsulates the media content. IP set top box 290 further decrypts and decodes the media content to produce analog video (e.g., component video, composite video, etc.) and analog audio, or digital video/audio (e.g., digital video interface (DVI) signals) for transmission to TV 293.

Hub 130(2) further contains a combiner 280 and a splitter 283. The combiner 280 combines various analog and digital signals for transport to customer premise 190 via an optical/electrical (O/E) node 286. The splitter 283 splits the signal coming from O/E node 286 into various components. O/E node 286 communicates via optical fiber to hub 130(2) and via coaxial (coax) cable to customer premise 190 in an HFC network. O/E node 286 may reside anywhere between hub 130(2) and customer premise 190, or alternatively, coax may connect hub 130(2) to customer premise 190 without using optical fiber.

The CMTS 120 is used to provide high speed data services including cable Internet, voice over IP (VoIP), and IP television services to various subscribers. CMTS 120 comprises a central processing unit (CPU) or data processing device 220 and a memory unit 230 for implementing DOCSIS ranging process 800, as described below. The CMTS 120 may also house an optical carrier unit 240, Ethernet unit 250, and a DOCSIS 3.1 (or greater) unit 270. Memory unit 220 stores data and/or software or processor instructions that are executed to carry out the operations of the techniques described herein, e.g., for implementing ranging functions of DOCSIS ranging process 800.

The data processing device 220 is, for example, a microprocessor, a microcontroller, systems on a chip (SOCs), or other fixed or programmable logic. The data processing device 220 is also referred to herein simply as a processor. The memory 230 may be any form of random access memory (RAM) or other tangible (non-transitory) memory media that stores data or instructions used for the techniques described herein. The memory 230 may be separate or part of the processor 220. Instructions for performing the process logic 800 may be stored in the memory 230 for execution by the processor 220 such that when executed by the processor, causes the processor to perform the operations describe herein in connection with FIG. 4.

The functions of the processor 220 may be implemented by a tangible processor or computer readable (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 230 stores data used for the computations or functions described herein (and/or to store software or processor instructions that are executed to carry out the computations or functions described herein). Thus, functions of the DOCSIS ranging process 800 may be implemented with fixed logic or programmable logic (e.g., software or computer instructions executed by a processor or field programmable gate array (FPGA)). It should be noted that the CM, e.g., CM 150(1), employs logic and/or instructions for generating the upstream narrowband ranging signal.

Units 220-270 may be circuit or line cards with embedded software or firmware that plug into a common chassis and communicate over a common bus 215 (e.g., a peripheral component interconnect (PCI) bus), or units 220-270 may be implemented by any conventional or other computer systems preferably equipped with a processor, memories and/or internal or external communications devices (e.g., modem, network cards, etc.).

The firmware or software for units 220-270 may be updated locally or remotely using various networking components. In addition, the software for the present invention embodiments (e.g., for DOCSIS ranging process 800, etc.) may be available on a recordable medium (e.g., magnetic, optical, floppy, DVD, CD, etc.), or in downloadable form from a source via a communication medium (e.g., network, WAN, LAN, Intranet, Internet, File Transfer Protocol (FTP) server, etc.).

Optical carrier unit 240 may communicate with HEF 110 or Internet 180 over network 115 using one of various SONET, SDH, or other protocols, such as OC-48 or OC-192 (in the U.S. and Canada), and STM-16 or STM-64 (outside of the U.S. and Canada). Ethernet unit 250 enables communication with local networking components (not shown). DOCSIS unit 270 is the CMTS 210 interface to CM 150(1) for digital data signals communicated between CMTS 210 and both the IP set top box 290 and LAN 297 via CM 150(1). Any hub in system 100 may include a CMTS provisioned to implement DOCSIS ranging process 800 and may be configured in a manner similar to hub 130(2). Components in the communication chain between CMTS 120 and CM 150(1) may affect propagation times for both downstream and upstream transmission, and as a result, the timing offset for CM 150(1).

Figure 3:
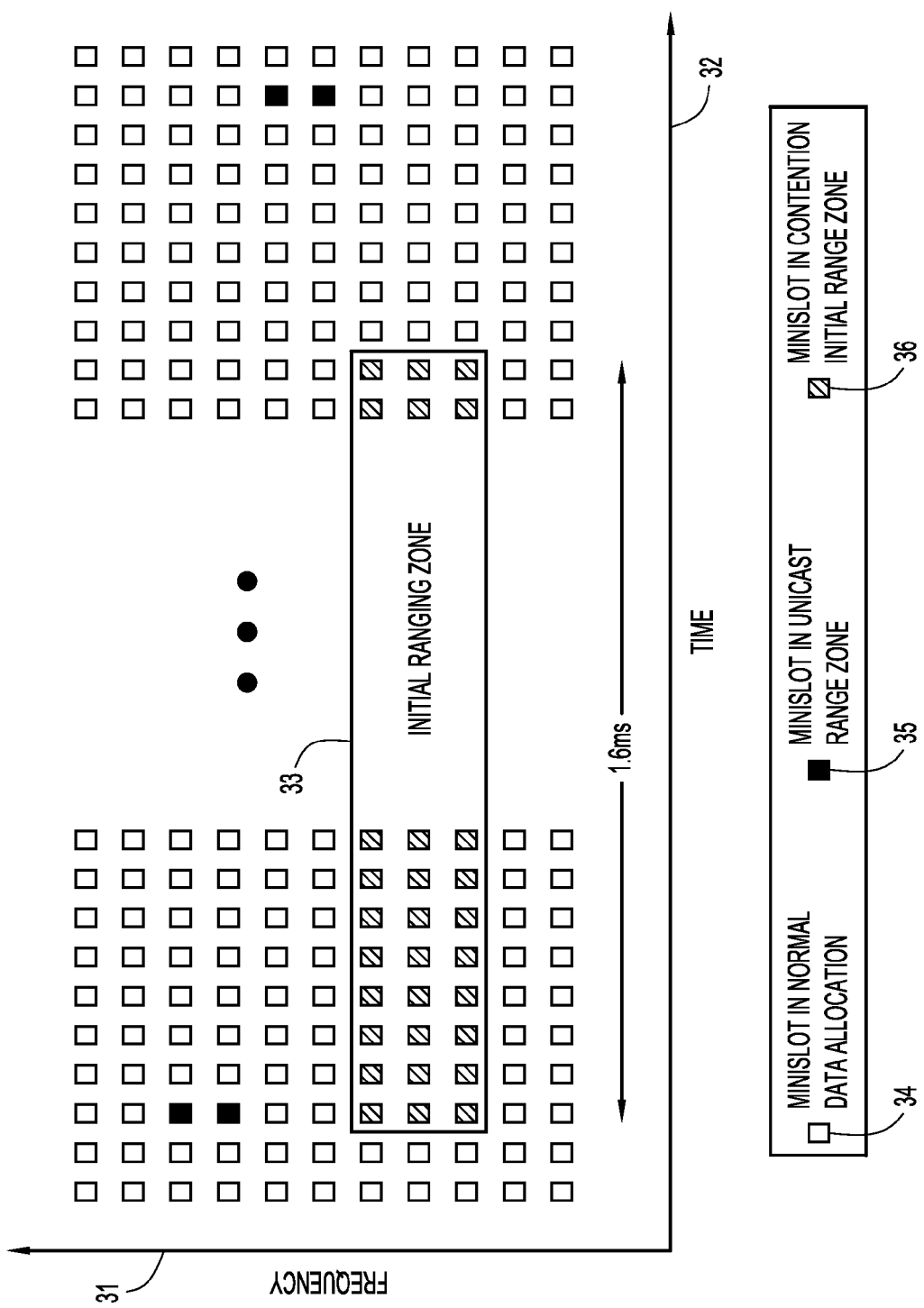
FIG. 3 is an example diagram of a 2-dimensional graph that depicts a ranging zone in terms of a time duration and a narrow band subset of subcarriers relative to an entire set of subcarriers available for upstream communication.

Referring to FIG. 3, an example diagram of a 2-dimensional graph 300 is shown that depicts a ranging zone in terms of a time duration and a narrow band subset of subcarriers relative to the set of subcarriers used for upstream transmissions. Graph 300 depicts a generalized representation of subcarriers along the vertical frequency axis 31 and time duration along the horizontal time axis 32 both in the form of mini-slots. For upstream traffic, the CMTS sends a Mini-slot Allocation Packet (MAP) that defines how future time slots (mini-slots) may be used for upstream (uplink) transmission from CMs to the host CMTS. In general, a mini-slot represents a period of time, a time slot, for transmitting various information from the CM to the CMTS on a per mini-slot basis, such as for transmitting ranging messages, data, or other maintenance and control information.

In this context, a mini-slot comprises a number of OFDM subcarriers, e.g., 8 or 16 subcarriers along frequency axis 31 and a predetermined time duration that corresponds to a number of symbols available in the mini-slot, e.g., tens of symbols. The number of subcarriers per mini-slot may vary beyond eight or 16, or include any number of subcarriers in between. The number of transmittable bits per symbol depends on the upstream modulation scheme employed from the CM to the CMTS. FIG. 3 further depicts a simple subset of mini-slot data types. For example, upstream data may be transmitted by way of mini-slots allocated for data as indicated by reference numeral 34 and comprises the majority of mini-slot data types depicted in FIG. 3. In addition, an initial ranging contention zone 33 may allocate a number of mini-slots 36 along frequency axis 31 and a predetermined time period as indicated along time axis 32, e.g., a 1.6 millisecond (ms) initial ranging duration as indicated in FIG. 3. The actual ranging zone 33 parameters, e.g., the number of mini-slot subcarriers and ranging duration, are configurable by the CMTS, or reconfigurable by the CMTS, if initially provided by the CM's configuration file as described hereinafter.

As shown in FIG. 3, not all the subcarriers shown on axis 31 are used for the initial ranging zone 33. In this regard, the relatively "narrow" or small number of initial ranging subcarriers relative to the total number of available subcarriers may be referred to herein as narrow band ranging subcarriers or signal. Once initial ranging is performed, ranging maintenance may be obtained by unicast mini-slots 35. The unicast mini-slots 35 may be used to confirm, adjust, or monitor ranging after initial, e.g., coarse ranging, has been performed. It should be understood that FIG. 3 is not to scale and the mini-slots depicted in FIG. 3 are not limited to the number or range shown. Any spatial gaps between the mini-slots are inserted for ease of illustration and do not necessarily indicate gaps in time and/or frequency.

Initial ranging is typically performed when a CM comes online, such as when a user or customer first powers up the CM. Upon power-up, the CM will typically perform a power-up self-check or test. Once the self-test is complete, the CM may either attempt to establish communication with the CMTS and/or if previously configured, the CM may attempt to download its configuration file from a designated server, such as a Trivial File Transfer Protocol (TFTP) server. The CM configuration file defines operational parameters for the CM. DOCSIS specifies type, length, value (TLV) parameters within the CM configuration file. For example, TLVs may define a configuration for an upstream service flow for the CM and is followed by a number of parameters (sub-TLVs) associated with the upstream service flow, such as quality of service type, maximum traffic rate, flow reference number, etc. When the CM reads its configuration file it would initially configure its upstream service flow according to the TLV specifying upstream service flow parameters. The configuration file may establish initial communication frequencies and parameters including initial ranging zone parameters.

At start-up the CM is unaware of its relative timing and may not have received a MAP message. In order to synchronize with the servicing (serving) CMTS, the CM may listen to downstream traffic or otherwise determine a ranging zone to obtain synchronization with the CMTS. Since the CM's upstream traffic is unsynchronized at the servicing CMTS, the techniques provide herein provide a mechanism for the CMTS to determine a given CM's timing offset and send that timing offset to the CM in order for that CM to synchronize its upstream transmissions for arrival at the CMTS. It should be noted that each CM attempts to synchronize its clock with that of the CMTS in order to advance mini-slot transmission timing based on propagation delay as described above.

Figure 4:
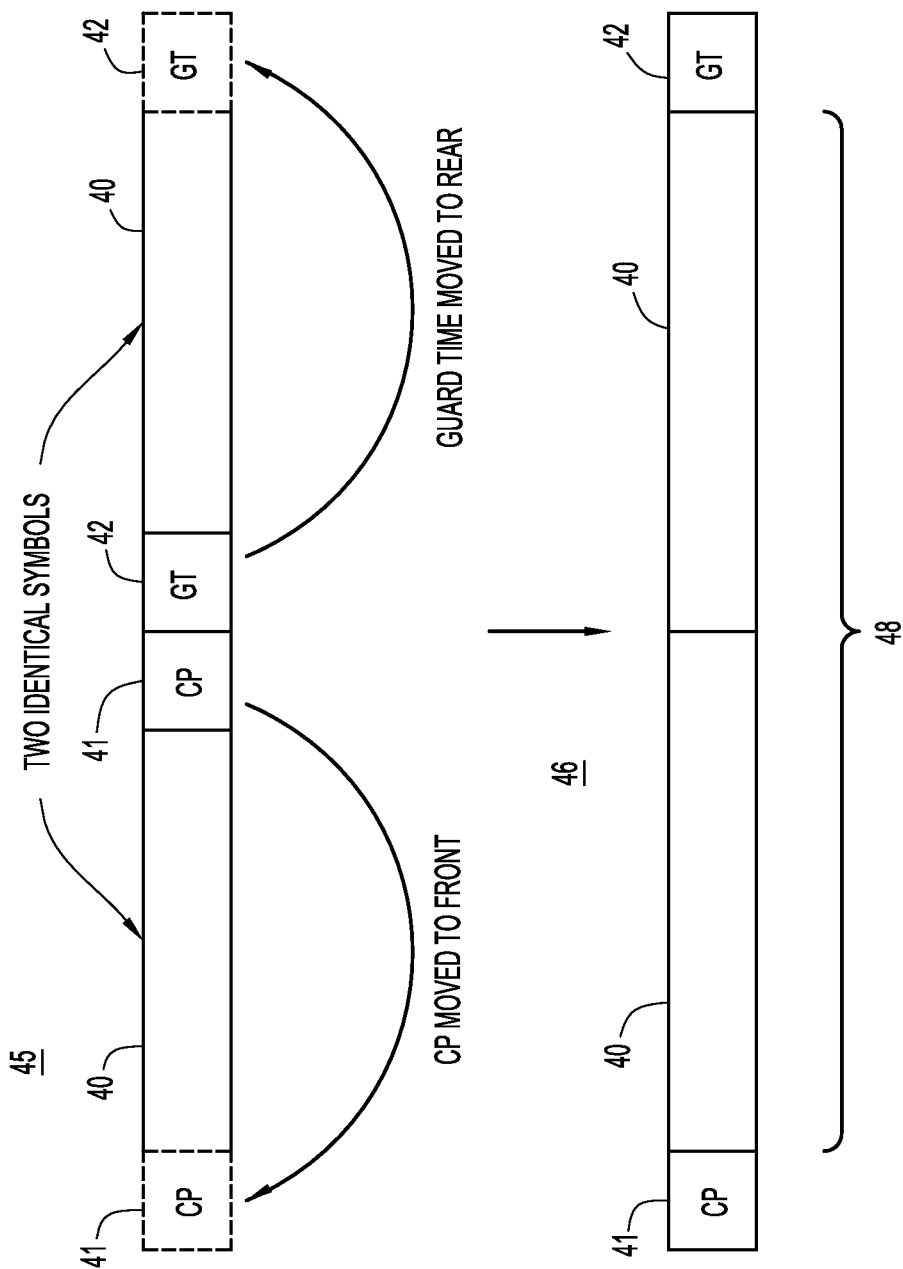
FIG. 4 is an example diagram of twin symbols that may be transmitted by a cable modem in order for a CMTS to establish a timing offset according to the techniques presented herein.

Turning to FIG. 4, an example diagram is provided showing symbols that may be transmitted by a CM in order for a CMTS to establish a timing offset according to the techniques presented herein. In this example, two consecutive and identical symbols 40 are transmitted as depicted generally at reference numeral 45. The two consecutively transmitted symbols 40 are referred to herein as "twin" symbols. Typically, in OFDM systems a symbol is transmitted with a preceding cyclic prefix (CP) and transmissions may be separated by a guard interval, period or time (GT). The CP and GT provide a mechanism to limit inter-symbol and/or multipath interference (in many communication systems), that is, to limit interference between transmitted symbols or other data. The CP may also repeat information transmitted within a symbol in order to reduce the aforementioned interference by way of circular convolution.

In this example, the OFDM system in use transmits a CP 41 followed by a GT 42 that is transmitted between symbols. According to the techniques described herein, the CP 41 and GT 42 are rearranged or moved such that identical and consecutive symbols 40, i.e., twin symbols 40, may be transmitted consecutively. The CP 41 and GT 42 as indicated by a solid lined rectangles are moved to the outer portions of consecutive symbols 40 prior to transmission from a given CM to the CMTS as indicated by dashed rectangles. After rearranging CP 41 and GT 42, the consecutive symbols 40 appear as shown generally at reference numeral 46 with reference numeral 48 denoting the twin symbol portion. Accordingly, during transmission, CP 41 is transmitted, followed by twin symbols 48, and then GT 42.

The GT allows the user equipment, e.g., a CM, to transmit upstream transmissions ahead of time using a timing advance scheme such that the upstream transmissions to the CMTS can be completed within the CMTS's reception time slots or windows. Late or early arriving transmissions may cause interference to neighboring CM communications, interference to subsequent data frames, or may be undetectable at the CMTS and may be lost. The greater the distance a CM is from a CMTS, the greater the timing advance adjustment needed for a given CM.

Figure 5:
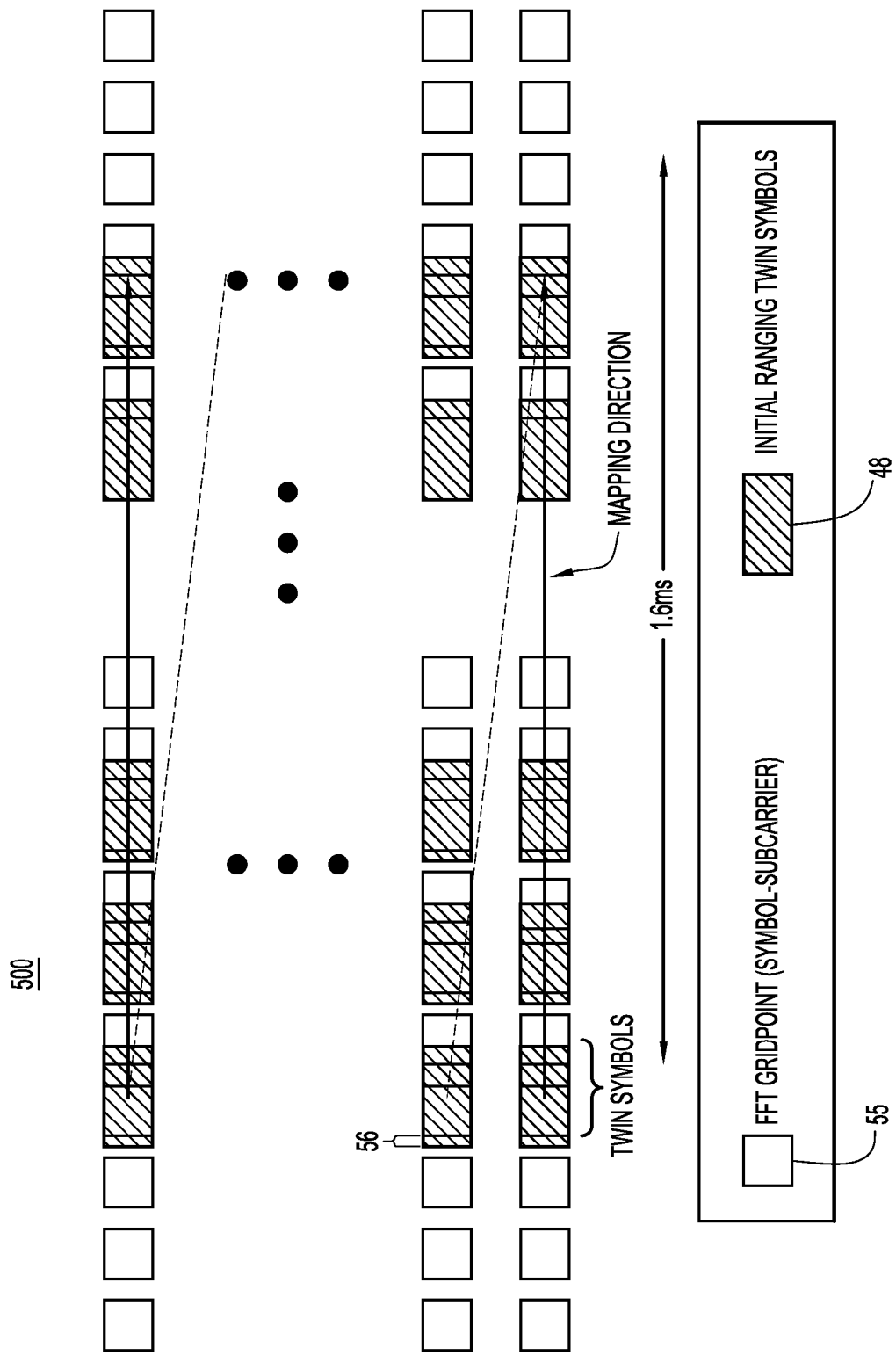
FIG. 5 is an example diagram of a Fast-Fourier Transform (FFT) grid in which transmitted twin symbols are illustratively superimposed upon FFT grid points according to the techniques presented herein.

Referring now to FIG. 5, a Fast-Fourier Transform (FFT) grid 500 is illustrated comprising symbols, e.g., received and processed by a CMTS. For example, in digital transmission systems, received signals are typically processed by way of analog-to-digital conversion and subsequent FFT processing. The FFT processing generates FFT "grid points" 55. In this example, a 1.6 ms duration shown for a portion of the FFT grid point 55 corresponds to the 1.6 ms initial ranging duration for ranging zone 33 as indicated in FIG. 3. The initial ranging twin symbols 48 are shown relative to the grid points 55 in a superimposed fashion.

Since the twin symbols 48 comprise at least two identical symbols, the twin symbol 48 have a time width or duration comparable to two symbols, and as such, twin symbols 48 overlap single symbol grid points 55 (or single symbol 40 shown in FIG. 4 prior to concatenation to form twin symbols 48). Spatial gaps in the FFT grip points 55 are provide for ease of illustration in FIG. 5. The twin symbol configuration ensures that at least a portion of the twin symbol 48 entirely overlaps a single entire symbol period, i.e., a lone, single, or non-concatenated symbol. In the example of FIG. 5, initial ranging twin symbols 48 do not align with the FFT grid points 55. The time duration for the amount of the twin symbol non-alignment or non-overlap region is indicated at reference numeral 56. Region 56 is the amount of time that twin symbols should be adjusted or offset to achieve twin symbol alignment with FFT grid points 55 at the receiver. Accordingly, the duration of non-overlap region 56 is proportional to the timing offset. The techniques described herein allow for the timing offset to be computed from region 56. Thus, at least in terms of time duration, a twin symbol 48 allows a complete resolution of a timing offset among received symbols. In other words, since a twin symbol overlaps at least one symbol, the range of a twin symbol allows a timing offset to be resolved with a resolution of at least one symbol.

Transmitting unsynchronized twin symbols can cause interference with other symbols in both time and frequency. In order to minimize interference, several techniques may be used. First, the ranging signal may be transmitted with low power, thereby reducing signal frequency bleed over, that is, into adjacent subcarriers. The lower the ranging signal power level, the lower the interference with neighboring data traffic. Another technique is to transmit a known bit sequence within the initial ranging signal. One such bit sequence may include a pseudo-random bit sequence (PRBS). To simplify PRBS detection at the receiver, the initial ranging signal PRBS may be modulated with Binary Phase Shift Keying (BPSK).

As described above, each symbol is repeated along (over) time, and a CP and a GT with the same length as CP, are appended at the front and end of the twin symbols. The twin symbols are mapped onto OFDM symbol-subcarrier grids following the same mapping rules as normal data. The only difference is that the mapping is done with a unit of two symbols, i.e., twin symbol mapping. The twin symbol mapping direction is illustrated in FIG. 5 as an overlay on grid points 55. The twin symbol structure allows the CMTS to capture a complete symbol regardless of the time offset of initial ranging signal, as described above, and thereby the CMTS can adjust the timing offset to compensate for propagation delay such that future data transmissions from the CM arrive at the CMTS during an expected mini-slot.

In a cable system environment, the initial ranging signal level should be relatively low, e.g., a Signal to Noise Ratio (SNR)<0 dB. The CMTS can be configured to detect the initial ranging signal in both time offset and power above the noise floor. Narrow band ranging signals are used to reduce the overhead for initial ranging, and one or two mini-slots are assigned for initial ranging zone. In this regard, the timing accuracy for determining the timing offset is inversely proportional to the signal frequency bandwidth, that is, the number of subcarriers assigned for initial ranging.

For example, an eight subcarrier mini-slot with 25 kHz subcarriers yields a ranging signal bandwidth of 200 kHz (8×25). Under normal operating conditions, a 200 kHz bandwidth yields a 5 µs time resolution, which may be too coarse for OFDM operation as most CP lengths are a few µs (microseconds). However, the techniques described herein, e.g., twin symbols, PRBS bits, etc., enable timing detection using such a narrow band signal. When PRBS bits are mapped with two identical (twin) symbols, the time offset has a maximum of one symbol ambiguity. In other words, during a maximum, edge, or full timing offset condition, the twin symbols may overlap two complete symbols. Even so, symbol ambiguity remains when conditions are less than edge limits. The timing offset may be relative to two different symbol FFT grid points, which leads to two potential timing offsets and, therefore, the correct offset may still have to be ascertained. In other words, the gap 56 shown in FIG. 5 may be positive or negative relative to the proportion of twin symbol overlap among consecutive grip points 55. If the gap is positive relative to a first grid point, it is negative relative to an adjacent grid point that is also overlapped by the twin symbol, and vice versa. As such, techniques are provided herein to reduce or eliminate the one symbol time ambiguity presented by the use of a twin symbol. Resolving symbol ambiguities is described below in connection with FIGS. 6 and 7.

Briefly, described herein are several techniques to improve ranging signal detection by improving SNR enhancement, phase rotation detection, and resolution of symbol ambiguity. For SNR enhancement, the upstream channel conditions generally remain static along (over) time and on same subcarrier, at least for a period of time that does not affect SNR enhancement. To achieve SNR enhancement, the received symbols along the time axis will be summed up on each subcarrier to enhance SNR. Duplicate symbols are repeated in time during the duration of the ranging signal, e.g., 1.6 ms. When a 4 k FFT is employed in the communication system, a symbol duration of 20 µs results, and yields 72 symbol time slots during a 1.6 ms ranging zone, taking into account a CP duration (2.5 µs) and other minor timing limitations.

To further explain, a PRBS may be defined as 96 bits and those 96 bits may be spread across eight subcarriers of a mini-slot, therefore requiring 12 symbol time slots (96÷8=12). However, since twin symbols are used for upstream ranging signals, the 12 symbol time slots are doubled to 24. Accordingly at most, three consecutive sets of PRBS sequences may be completely transmitted during the ranging zone duration of 1.6 ms without overlapping the edges of the ranging zone. Thus, identical symbols are transmitted with the same subcarrier, but in multiple time slots. The received signals from these duplicate identical symbols are summed to enhance SNR, that is, to elevate the signal above the noise level for detection. Using these summing techniques, the SNR can be approximately enhanced by a factor of 10*log 10(N), where N is the length of the initial ranging signal along time axis.

Another technique is to implement phase rotation detection, where the time offset detection is detected through the phase rotation of symbols along the frequency axis. In other words, the subcarriers, e.g., eight mini-slot subcarriers, by which the upstream ranging signal is transmitted, are nominally phase shifted according to their transmitted frequency. The techniques described herein provide a phase compensation to improve accuracy during ranging signal detection.

The phase rotation algorithm is explained with the following configuration for PRBS bits prior to OFDM mapping and transmission:

A symbol duration 20 μs, when a 4 k FFT configuration is employed;
A CP of 2.5 μs;
An initial ranging zone of 72 symbols (1.6 ms) and an 8 subcarrier mini-slot; and
An initial ranging PRBS denoted as s, $(s_1, s_2, \ldots, s_N)$ with N=96 bits; where $(s_1, s_2, \ldots, s_N)$ can be rewritten in matrix form as $s_{i,j}$, where i=1, 2, … 8 (subcarriers) and j=1, 2, … 12 symbol time slots.

After an FFT is applied at the receiver, the symbols in the initial ranging zone may be denoted in matrix form as $r_{i,j}$, where i is the subcarrier index i=1, 2, …, 8, and j is the symbol index j=1, 2, … 72 across the entire 1.6 ms ranging zone. The correlation in time on a per subcarrier basis may be computed to enhance received signal strength:

$a_i(j0) = \Sigma_{n=1}^{12}(s_{i,n}*conj(r_{i,j0+2*n}))$, with subcarriers i=1, 2, …, 8, j0 is the index of the starting symbol to guarantee reception of at least one complete 24 twin symbol PRBS matrix, where conj( ) is the complex conjugate and where j0=1, 2, … 48, where 48=72 symbols−24 PRBS symbols, thereby ensuring that at least one whole PRBS has been captured in the ranging zone.

The phase rotation across the frequency axis on a per starting symbol basis may be computed as:

$b(j0) = \Sigma_{i=1}^{7}(a_i(j0)*conj(a_{i+1}(j0)))$; phs_delta(j0)=angle(b(j0)); where conj( ) is the complex conjugate and where phs_delta(j0) is the phase rotation along frequency axis detected with j0 index.

The phs_delta(j0) or angle(b(j0)) for each starting symbol j0 is individually coherently combined with the corresponding symbol summations $a_i$ (j0) to obtain SNR enhanced and phase compensated correlation peak (cor_peak) signals. The cor_peak signals may be computed as:

$$cor\_peak(j0) = \Sigma_{i=1}^{8} a_i(j0)*exp(-phs\_delta(j0)*i)$$

where cor_peak(j0) is the peak detected with j0 symbol index and exp( ) is the exponential function.

In general, the timing offset (t_offset) may be computed as:
t_offset(j0)=j0×t_eff−phs_delta(j0)/2/π/sc; where t_eff is the effective symbol duration, e.g., 20 μs+CP, and sc is the subcarrier spacing, e.g., 50 kHz with a 4 k FFT.

Figure 6:
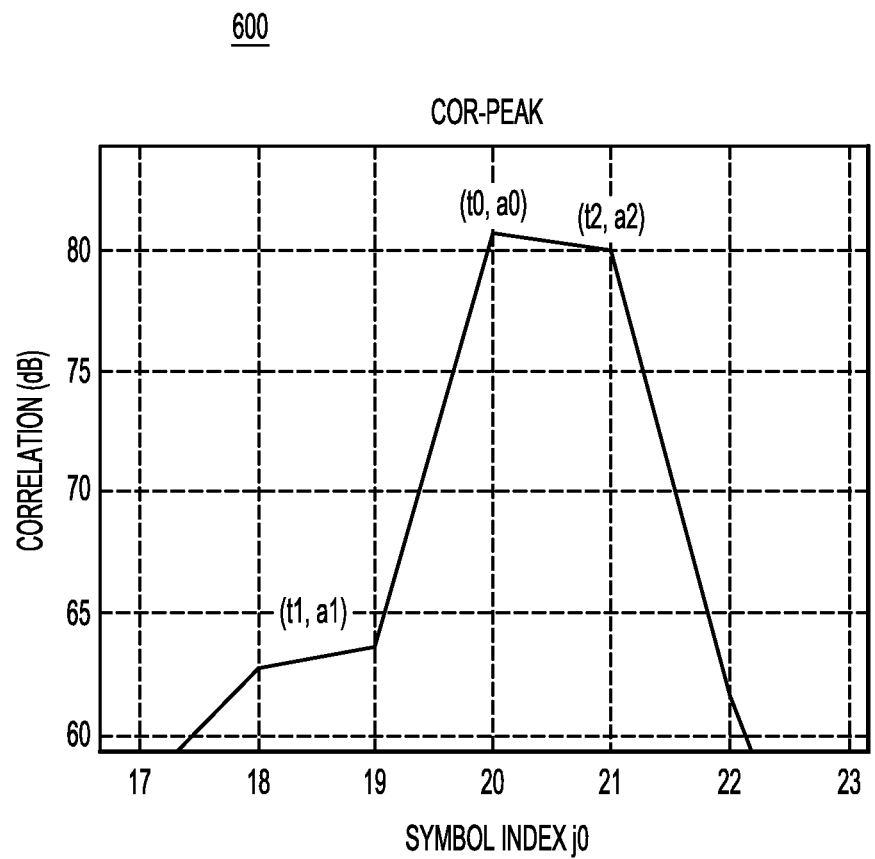
FIG. 6 is an example diagram of a graph that depicts data points for correlation peaks after received twin symbols are processed at the CMTS for use in computing a timing offset.

An example plot of correlation peak (cor_peak) values computed from a simulated signal is shown in FIG. 6 as a graph generally depicted at reference numeral 600. Graph 600 shows correlation values in dB along the vertical axis and symbol index on the horizontal axis. The symbol index refers to individual ones of 72 symbol indices available across a 1.6 ms ranging zone or window, e.g., as described in the examples above. As shown in FIG. 6, the maximum value or largest peak of approximately 81 dB occurs at symbol index 20, and is denoted as (t0, a0), where t0 comprises an index value of 20 and a0 is equal to ~81 dB.

It should be understood that since the initial ranging signal transmitted by the CM is unsynchronized, as illustrated by the gap 56 shown in FIG. 5, the actual signal peak for twin symbol measurement is not necessarily aligned with a single symbol, but may span two or even three symbols. Accordingly, a strong peak may also appear in a symbol that is adjacent to the peak magnitude symbol, i.e., adjacent to the peak symbol denoted as (t0, a0). This is the case shown in FIG. 6 in which a peak occurs at symbol index 21 and denoted as (t2, a2). The next closest value to correlation peak (t0, a0) occurs at symbol index 19, and is denoted as (t1, a1). However, the received signal measurements are made with reference to known symbol index timing, and as such, the correlation peaks on either side of the maximum peak are checked to determine the next closest peak. According to the techniques described herein, t0, t1, and t2 represent a time difference between a scheduled time slot of a particular index closest to correlation peak a0, a1, and a2, and the actual times of the corresponding correlation peak measured by the receiver. Conceptually, t0, t1, and t2, are related, but not necessarily equivalent to, the non-overlapping regions as indicated by reference numeral 56 shown in FIG. 5. Accordingly, the values of t0, t1, and t2 may be positive or negative relative to a particular symbol index. Again, the non-overlapping region 56 may have a negative time value.

The values of the adjacent peaks, such as a1 and a2, may be of relevance since transmission channel effects, noise and interference may affect the overall magnitude of a given adjacent correlation peak. To minimize this ambiguity, the highest correlation peak, e.g., a0, and the adjacent correlation peaks are used to determine the timing offset to be employed for initial ranging. It will be appreciated that after initial ranging, subsequent ranging operations, such as unicast symbol ranging, may be employed to fine tune the timing offset.

Figure 7:
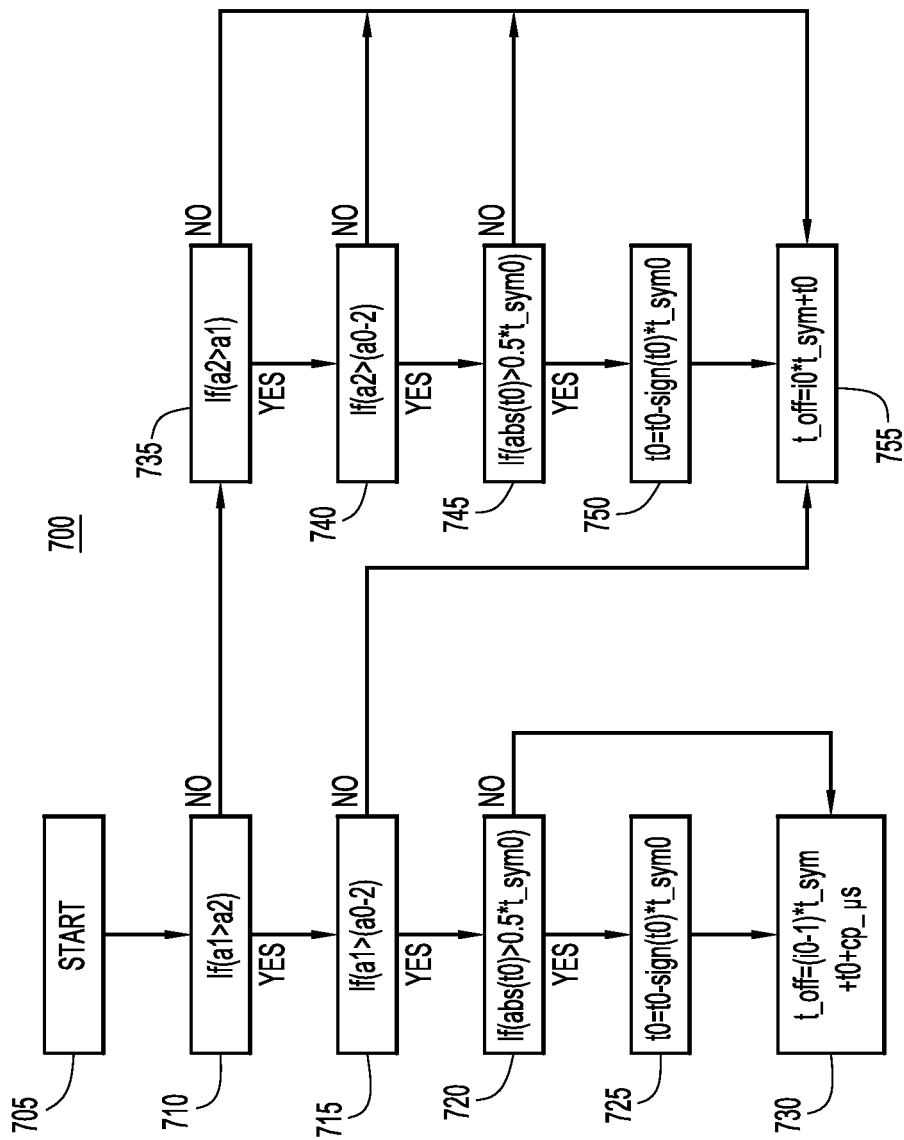
FIG. 7 is an example procedural flowchart for computing a timing offset using the data points shown in FIG. 6.

The time offset ambiguity, a one symbol offset, is resolved by comparing peaks on the sequence correlation curve as mentioned above. Computing a timing offset using adjacent peak magnitudes is further described in connection with FIG. 7. FIG. 7 is a procedural flowchart illustrating a specific example of a timing offset computation process 700 that may compute a timing offset using multiple peak magnitudes, e.g., a0, a1 and a2 present in the data points shown in FIG. 6. For this example, abs( ) indicates an absolute value function or operation, sign ( ) indicates operation of the signum function, t_sym0 is the symbol duration in μs, cp_μs is the CP duration in μs, t_sym is the effective symbol duration (t_sym0+cp_μs), i0 is the symbol index of the maximum peak, and t0 is the time of the maximum peak as shown in FIG. 6.

Process 700 starts at 705 and, at 710, a determination is made whether a1 is greater than a2. If a1 is not greater than a2, process 700 proceeds to 735; otherwise process 700 proceeds to 715. At 715, process 700 determines if a1 is greater than a0−2. If not, process 700 proceeds to 755, otherwise process 700 proceeds to 720. At 720, process 700 determines if abs (t0) is greater than half the symbol duration t_sym0, i.e. 0.5×t_sym0. The half symbol provides a decision point for determining whether timing offset computations are more conveniently made with respect to one symbol index or an adjacent symbol index. If not, at 730, the timing offset, t_off, is computed as (i0−1)×t_sym+t0+cp_μs.

In other words, the timing offset is based on the symbol index (i0−1) prior to the peak a0 multiplied by the effective symbol duration (t_sym) to obtain an absolute time difference from the start of the ranging zone to the prior symbol. In this example, the t_off value would start at index 19×22.5 µs (t_sym). The value of t_off is further adjusted at 730 by adding the measured time difference t0 at the peak symbol index 20 and the CP duration cp_µs. If, at 720, the absolute value of t0 is greater than half of the effective symbol duration t_off, t0 is adjusted at 725 prior to computational use at 730. At 725, when the absolute value of t0 is greater than half of a symbol, the sign( )function allows the value of t0 to be adjusted by the symbol duration t_sym0 multiplied by the sign of t0, the positive or negative sign of the t0 value. Mathematically sign(t0) is +1 or −1.

At 735, the inverse of the techniques employed at 710 are performed. At 735, it is determined if a2 is greater than a1. If a2 is not greater than a1, process 700 proceeds to 755; otherwise process 700 proceeds to 740. If the logic applied at 710 and 735 are both not true, then a1 is equal to a2. Accordingly, the timing offset t_off is computed at 755 as the correlation peak index i0 multiplied by the effective symbol duration t_sym with the measured timing differential t0 added to complete the timing offset computation. In this regard, the combination of operations 710 and 715 involves determining whether a1 is greater than a2 and sufficiently greater than a0 to warrant a1 as the t_off computational basis and if not, the computation at 755 applies.

When, at 735, it is determined that a2 is greater than a1, then process 700 proceeds to operations 740, 745, 750, and ultimately to operation 755. The operations performed at 740, 745, and 750 correspond to the operations performed at 715, 720 and 725 as described above. Thus, process 700 provides an example technique for computing a timing offset using twin symbols, and provides further advantages with respect to ranging signals transmitted via a narrow band signal.

Figure 8:
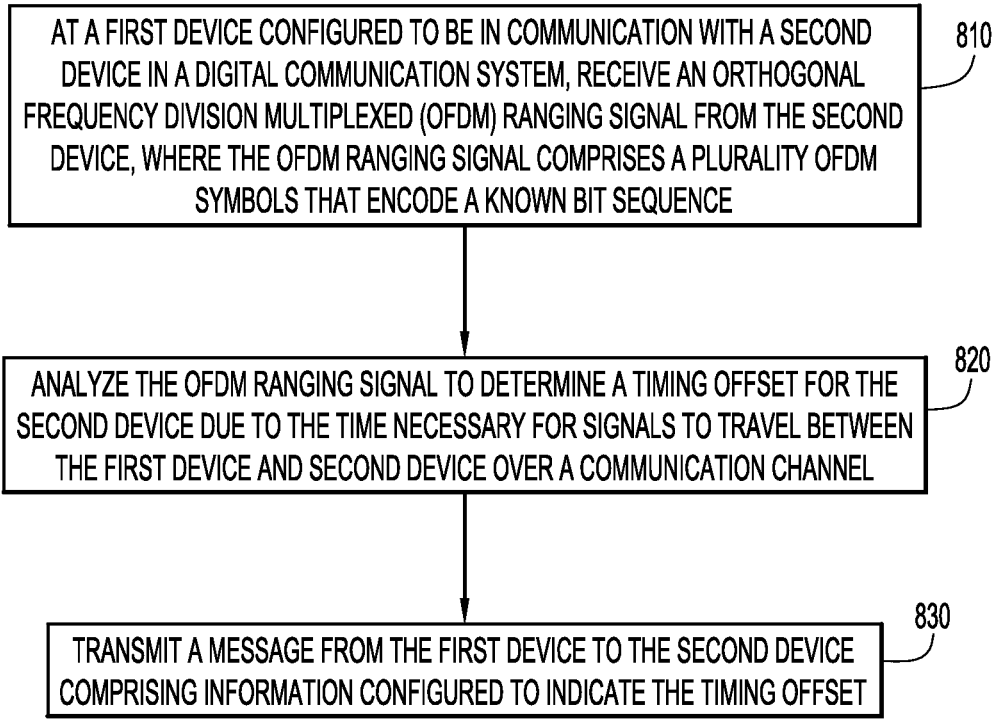
FIG. 8 is an example generalized procedural flowchart for computing a timing offset using a narrow band OFDM ranging signal according to the techniques presented herein.

Referring now to FIG. 8, a flowchart is described of a generalized process (the aforementioned DOCSIS ranging process 800) for computing a timing offset using a narrow band OFDM ranging signal according to the techniques presented herein. At 810, at a first device, such as a CMTS, configured to be in communication with a second device, e.g., a CM, in a digital communication system, receives an OFDM ranging signal from the second device. The OFDM ranging signal comprises a plurality OFDM symbols that encode a known bit sequence, e.g., within a subset of available OFDM subcarriers and a subset of available time slots. The OFDM ranging signal comprises a subset of available OFDM communication subcarriers and a subset of available time slots. At 820, the OFDM ranging signal is analyzed to determine a timing offset for the second device due to the time necessary for signals to travel between the first device and second device over a communication channel. The OFDM ranging signal may be analyzed using the example techniques described above in connection with FIG. 7. At 830, a message is transmitted from the first device to the second device, the message including information configured to indicate the timing offset.

To summarize, the known bit sequence, e.g., a PRBS, may be correlated with symbols in the OFDM ranging signal to determine a symbol index that indicates a starting location or time slot for symbols representing the bit sequence in the OFDM ranging signal. In addition, a transform may be performed on the received OFDM ranging signal, such as an FFT, to generate a matrix of symbol values with rows selected by a subcarrier index and columns selected by a symbol index. The subcarrier index corresponds to an individual subcarrier of the subset of available subcarriers and the symbol index corresponds to a time slot in the subset of available time slots, and the symbol values may be mapped in the matrix according to a mapping based on bits in the known bit sequence, and for each of the subcarrier indices and each of a given number of symbol indices. An arithmetic combination is made (summed) of the bit values in the known bit sequence and corresponding mapped symbol values in the matrix to produce a plurality of summations. The summation value for a given summation indicates a correlation between the bits in the known bit sequence and symbol values mapped in the matrix. Thus, determining the timing offset involves selecting a summation, among the plurality of summations, that has a highest correlation between the bits in the known bit sequence and symbol values mapped in the matrix. Summing may involve summing arithmetic combinations on a per subcarrier index basis to produce a set of subcarrier summations for each of the given number of symbol indices. The analysis of the OFDM ranging signal may involve computing a plurality of phase rotations between adjacent subcarriers by computing arithmetic combination of pairs of adjacent subcarrier summations, and summing phase rotations between subcarriers to produce the phase rotation.

The OFDM ranging signal may include consecutive duplicates, e.g., twin symbols, of each the plurality of OFDM symbols without a guard time or cyclic prefix between the duplicates of the plurality of symbols. This ensures that each of the duplicates of the plurality of OFDM symbols received at the first device occurs during a scheduled single symbol receive period duration. The received twin symbols may result in ambiguity with respect to scheduled symbol reception, and may be resolved by computing correlation peaks about (with respect to) potential starting time slots (locations), corresponding to symbol indices about which correlation peaks occur due to a CM's initial upstream transmission schedule before timing offset adjustment. The magnitudes of the correlation peaks computed for symbol indices immediately before and after the starting time slot may be compared, and the timing offset is adjusted based on the comparison of correlation peaks before and after the starting time slot. Specifically, an adjustment value or amount is computed for the timing offset based on a comparison of magnitudes of correlation peaks for first and second correlation peaks with the correlation peak associated with a starting time slot. The timing offset is then adjusted according to the adjustment value.

The first device may comprise a CMTS and the second device may comprise a CM, both operating in the digital communication system in accordance with the Data Over Cable Service Interface Specification (DOCSIS). The known bit sequence may comprise a PRBS and is modulated according to a BPSK scheme. The ranging signal may be transmitted at a power level above a noise floor and below a power threshold that minimizes interference with other transmissions on the same transmission medium due to an unsynchronized ranging signal. The power threshold may be determined by signal analysis, empirically, or using other known techniques. The ranging signal may comprise multiple copies of the plurality OFDM symbols, and corresponding symbols in each copy may be summed in order to increase the signal strength of the received plurality OFDM symbols.

Figure 9A:
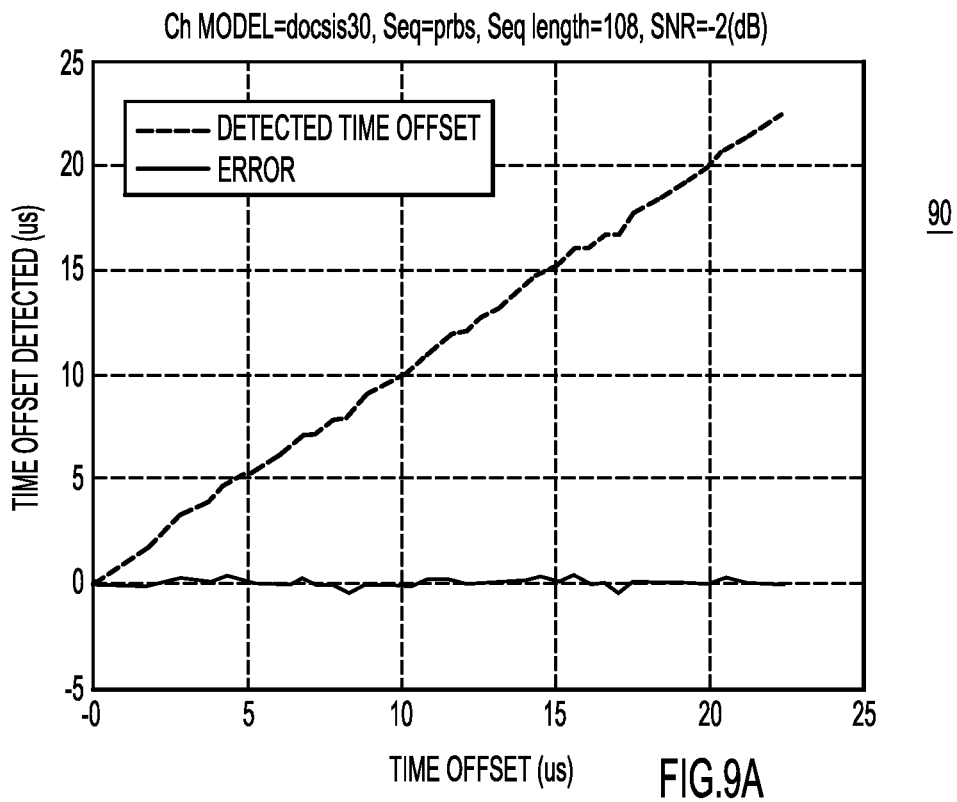
FIGS. 9A, 9B, 9C and 9D depict simulation results and illustrate the relationships between actual timing offsets and offsets detected according to the techniques described herein.
Figure 9B:
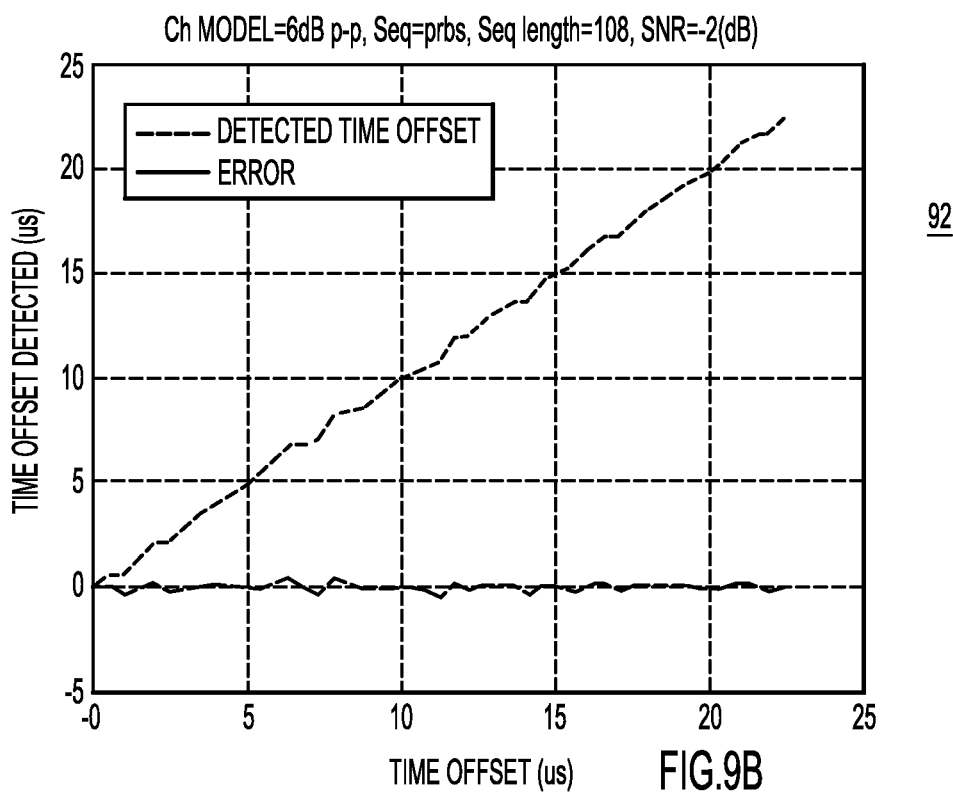
Figure 9C:
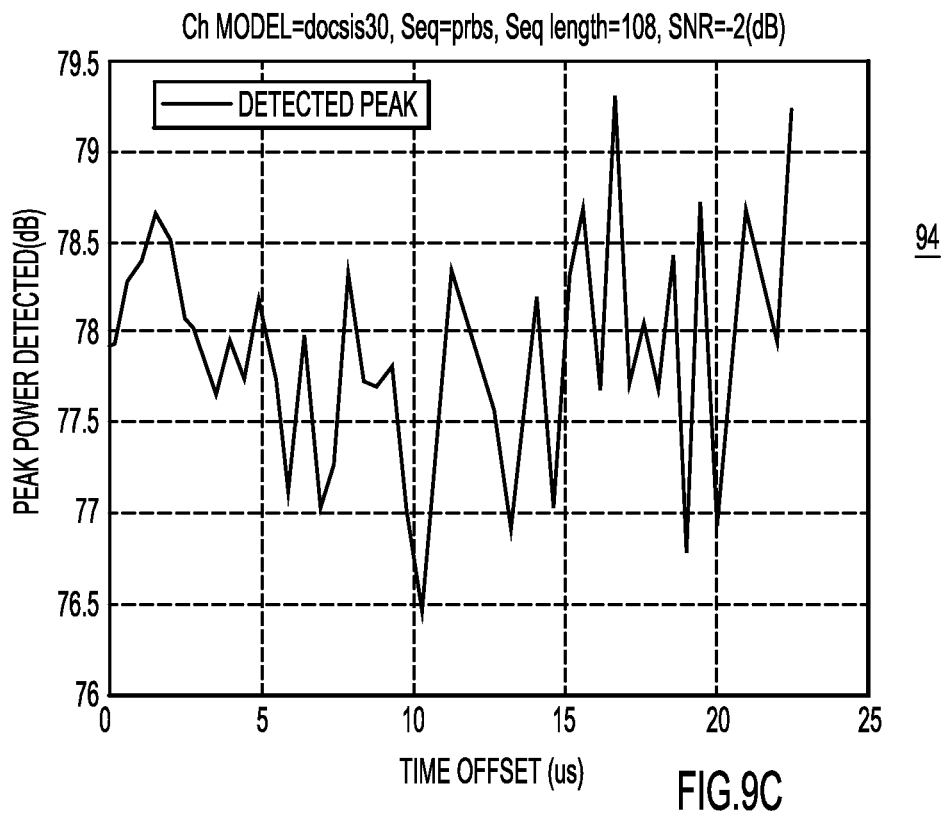
Figure 9D:
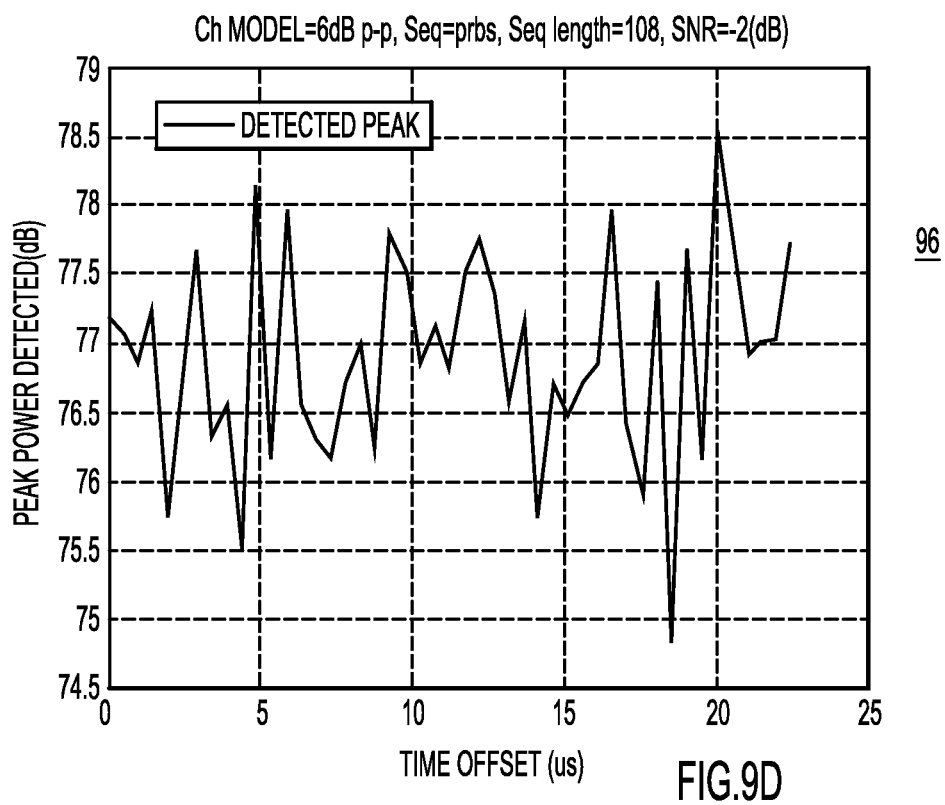

FIGS. 9A and 9B depict simulation results at plots 90 and 92, respectively, which indicate that the techniques provided herein are operable with an SNR down to −2 dB with two channel different models, and short PRBS sequences, e.g., 108 bits in length. A time accuracy better than 0.2 µs is achieved. FIGS. 9C and 9D depict plots of peak power at reference numerals 94 and 96, respectively, that correspond to the channel models used for plots 90 and 92, of FIGS. 9A and 9B, respectively. It should be noted that the simulation results shown in FIGS. 9A, 9B, 9C, and 9D were computed using 9 subcarriers and a corresponding PRBS of 108 bits (108=9× 12). A power accuracy of ~+/−1 dB is attained and any power variation is generally due to channel variation as only one mini-slot used for ranging in these examples.

In sum, a method is provided in which a first device configured to be in communication with a second device in a digital communication system receives an orthogonal frequency division multiplexed (OFDM) ranging signal from the second device, where the OFDM ranging signal comprises a plurality OFDM symbols that encode a known bit sequence within a subset of available OFDM subcarriers and a subset of available time slots. The OFDM ranging signal is analyzed to determine a timing offset for the second device due to a time for signals to travel between the first device and second device over a communication channel. A message is transmitted from the first device to the second device, the message including information configured to indicate the timing offset The above description is intended by way of example only. Various modifications and structural changes may be made therein without departing from the scope of the concepts described herein and within the scope and range of equivalents of the claims.

What is claimed is:

1. A method comprising:
at a first device configured to be in communication with a second device in a digital communication system, receiving an orthogonal frequency division multiplexed (OFDM) ranging signal from the second device, wherein the OFDM ranging signal comprises a plurality OFDM symbols that encode a known bit sequence within a subset of available OFDM subcarriers and a subset of available time slots, wherein each of the plurality of OFDM symbols is duplicated in time without a guard time or cyclic prefix between consecutive duplicates of the respective symbol to ensure that each of the consecutive duplicates received at the first device overlaps a respective scheduled single symbol receive period duration;
analyzing the OFDM ranging signal to determine a timing offset for the second device due to a time for signals to travel between the first device and second device over a communication channel based on alignment of at least one of the consecutive duplicates of the plurality of OFDM symbols and a respective overlapped scheduled single symbol receive period duration; and
transmitting a message from the first device to the second device, the message including information configured to indicate the timing offset.

2. The method of claim 1, further comprising correlating the known bit sequence with symbols in the OFDM ranging signal to determine a symbol index that indicates a starting time slot for symbols representing the bit sequence in the OFDM ranging signal.

3. The method of claim 2, further comprising:
performing a transform on the received OFDM ranging signal to generate a matrix of symbol values with rows by a subcarrier index and columns by a symbol index, wherein the subcarrier index corresponds to an individual subcarrier of the subset of available subcarriers and the symbol index corresponds to a time slot in the subset of available time slots, and wherein the symbol values are mapped in the matrix according to a mapping based on bits in the known bit sequence; and
for each of the subcarrier indices and for a predetermined number of symbol indices, first summing an arithmetic combination of the bit values in the known bit sequence and corresponding mapped symbol values in the matrix to produce a plurality of summations corresponding to the predetermined number of symbol indices, wherein a summation value for a given summation indicates a correlation between the bits in the known bit sequence and symbol values mapped in the matrix, and wherein analyzing the OFDM ranging signal to determine the timing offset comprises selecting a summation, among the plurality of summations, that has a highest correlation between the bits in the known bit sequence and symbol values mapped in the matrix.

4. The method of claim 3, further comprising:
second summing arithmetic combinations of pairs of summations for adjacent symbol indices on a per subcarrier index basis to produce a subcarrier summation for each of the predetermined number of symbol indices;
computing a phase rotation for each of the subcarrier summations; and
wherein correlating comprises third summing, for each computed phase rotation, arithmetic combinations of a given phase rotation and a corresponding summation to generate correlation peaks for each of the predetermined subcarrier indices, wherein each correlation peak is a summation that has been adjusted for a corresponding phase rotation.

5. The method of claim 4, wherein analyzing comprises selecting the correlation peak with the highest correlation magnitude as the starting time slot, and further comprising resolving any ambiguity induced by the consecutively received duplicates with regard to the starting time slot by selecting first and second correlation peaks with symbol indices immediately before and after the time slot.

6. The method of claim 5, wherein analyzing further comprises:
comparing magnitudes of the correlation peaks for the first and second correlation peaks with the correlation peak associated with the starting time slot;
computing an adjustment to the timing offset based on the comparison; and
adjusting the timing offset according to the adjustment.

7. The method of claim 1, wherein the first device comprises a cable modem termination system and the second device comprises a cable modem, both operating in the digital communication system in accordance with the Data Over Cable Service Interface Specification (DOCSIS).

8. The method of claim 1, wherein the known bit sequence comprises a pseudo-random bit sequence, and wherein the known bit sequence is modulated according to a binary phase-shift keying scheme.

9. The method of claim 1, wherein the ranging signal is transmitted at a power level above a noise floor and below a power threshold that minimizes interference with other transmissions on the same transmission medium due to an unsynchronized ranging signal.

10. The method of claim 1, wherein the ranging signal comprises multiple copies of the plurality OFDM symbols, and further comprising summing corresponding symbols in each copy to increase the signal strength of the received plurality OFDM symbols.

11. An apparatus comprising:
a network interface unit configured to receive and transmit signals over a communication channel; and
a processor coupled to the network interface unit, and configured to:
receive an orthogonal frequency division multiplexed (OFDM) ranging signal from a client device, wherein the OFDM ranging signal comprises a plurality OFDM symbols that encode a known bit sequence within a subset of available OFDM subcarriers and a subset of available time slots, wherein each of the plurality of OFDM symbols is duplicated in time without a guard time or cyclic prefix between consecutive duplicates of the respective symbol to ensure that each of the consecutive duplicates received at the apparatus overlaps a respective scheduled single symbol receive period duration;

analyze the OFDM ranging signal to determine a timing offset for the client device due to a time for signals to travel between the apparatus and the client device over a communication channel based on alignment of at least one of the consecutive duplicates of the plurality of OFDM symbols and a respective overlapped scheduled single symbol receive period duration; and generate a message to be transmitted to the client device, the message including information configured to indicate the timing offset.

12. The apparatus of claim 11, wherein the processor is further configured to correlate the known bit sequence with symbols in the OFDM ranging signal to determine a symbol index that indicates a starting time slot for symbols representing the bit sequence in the OFDM ranging signal.

13. The apparatus of claim 12, wherein the processor is further configured to:
perform a transform on the received OFDM ranging signal to generate a matrix of symbol values with rows by a subcarrier index and columns by a symbol index, wherein the subcarrier index corresponds to an individual subcarrier of the subset of available subcarriers and the symbol index corresponds to a time slot in the subset of available time slots, and wherein the symbol values are mapped in the matrix according to a mapping based on bits in the known bit sequence;

for each of the subcarrier indices and for a predetermined number of symbol indices, first sum an arithmetic combination of the bit values in the known bit sequence and corresponding mapped symbol values in the matrix to produce a plurality of summations corresponding to the predetermined number of symbol indices, wherein a summation value for a given summation indicates a correlation between the bits in the known bit sequence and symbol values mapped in the matrix; and analyze the OFDM ranging signal to determine the timing offset by selecting a summation, among the plurality of summations, that has a highest correlation between the bits in the known bit sequence and symbol values mapped in the matrix.

14. The apparatus of claim 13, wherein the processor is further configured to:
second sum arithmetic combinations of pairs of summations for adjacent symbol indices on a per subcarrier index basis to produce a subcarrier summation for each of the predetermined number of symbol indices;

compute a phase rotation for each of the sub carrier summations;

third sum, for each computed phase rotation, arithmetic combinations of a given phase rotation and a corresponding summation to generate correlation peaks for each of the predetermined subcarrier indices, wherein each correlation peak is a summation that has been adjusted for a corresponding phase rotation;

select the correlation peak with the highest correlation magnitude as the starting time slot;

resolve any ambiguity induced by the consecutively received duplicates with regard to the starting time slot by selecting first and second correlation peaks with symbol indices immediately before and after the time slot;

compare magnitudes of the correlation peaks for the first and second correlation peaks with the correlation peak associated with the starting time slot;

compute an adjustment to the timing offset based on the comparison; and adjust the timing offset according to the adjustment.

15. A system comprising the apparatus of claim 11 and the client device, wherein the client device is configured to generate and transmit the OFDM ranging signal.

16. A non-transitory computer readable storage medium storing instructions that, when executed by a processor, cause the processor to:
receive an orthogonal frequency division multiplexed (OFDM) ranging signal at a first device from a second device, wherein the OFDM ranging signal comprises a plurality OFDM symbols that encode a known bit sequence within a subset of available OFDM communication subcarriers and a subset of available time slots, wherein each of the plurality of OFDM symbols is duplicated in time without a guard time or cyclic prefix between consecutive duplicates of the respective symbol to ensure that each of the consecutive duplicates received at the first device overlaps a respective scheduled single symbol receive period duration;

analyze the OFDM ranging signal to determine a timing offset for the second device due to a time for signals to travel between the first device and second device over a communication channel based on alignment of at least one of the consecutive duplicates of the plurality of OFDM symbols and a respective overlapped scheduled single symbol receive period duration; and generate a message to be transmitted to the second device, the message comprising information configured to indicate the timing offset.

17. The non-transitory computer readable storage medium of claim 16, further comprising instructions that, when executed by the processor, cause the processor to correlate the known bit sequence with symbols in the OFDM ranging signal to determine a symbol index that indicates a starting time slot for symbols representing the bit sequence in the OFDM ranging signal.

18. The non-transitory computer readable storage medium of claim 17, further comprising instructions that, when executed by the processor, cause the processor to:
perform a transform on the received OFDM ranging signal to generate a matrix of symbol values with rows by a subcarrier index and columns by a symbol index, wherein the subcarrier index corresponds to an individual subcarrier of the subset of available subcarriers and the symbol index corresponds to a time slot in the subset of available time slots, and wherein the symbol values are mapped in the matrix according to a mapping based on bits in the known bit sequence;

for each of the subcarrier indices and or a predetermined number of symbol indices, first sum an arithmetic combination of the bit values in the known bit sequence and corresponding mapped symbol values in the matrix to produce a plurality of summations corresponding to the predetermined number of symbol indices, wherein a summation value for a given summation indicates a correlation between the bits in the known bit sequence and symbol values mapped in the matrix; and analyze the OFDM ranging signal to determine the timing offset by selecting a summation, among the plurality of summations, that has a highest correlation between the bits in the known bit sequence and symbol values mapped in the matrix.

19. The non-transitory computer readable storage medium of claim 18, further comprising instructions that, when executed by the processor, cause the processor to:

second sum arithmetic combinations of pairs of summations for adjacent symbol indices on a per subcarrier index basis to produce a subcarrier summation for each of the predetermined number of symbol indices;

compute a phase rotation for each of the subcarrier summations;

third sum, for each computed phase rotation, arithmetic combinations of a given phase rotation and a corresponding summation to generate correlation peaks for each of the predetermined subcarrier indices, wherein each correlation peak is a summation that has been adjusted for a corresponding phase rotation;

select the correlation peak with the highest correlation magnitude as the starting time slot;

resolve any ambiguity induced by the consecutively received duplicates with regard to the starting time slot by selecting first and second correlation peaks with symbol indices immediately before and after the time slot;

compare magnitudes of the correlation peaks for the first and second correlation peaks with the correlation peak associated with the starting time slot;

compute an adjustment to the timing offset based on the comparison; and adjust the timing offset according to the adjustment.

20. The non-transitory computer readable storage medium of claim 16, wherein the known bit sequence comprises a pseudo-random bit sequence, and wherein the known bit sequence is modulated according to a binary phase-shift keying scheme.

* * * * *